Patented Feb. 19, 1952

2,586,473

UNITED STATES PATENT OFFICE 2,586,473

WOOD LAMINATE BONDED WITH AN ADHESIVE COMPRISING MELAMINE FORMALDEHYDE RESIN AND AN ESTER OF GLYCEROL AND SEBACIC ACID

John C. Mead and William C. Schneider, Stamford, Conn., assignors to American Cyanamid Company, New York, N. Y., a corporation of Maine No Drawing. Application September 7, 1946, Serial No. 695,548

5 Claims. (Cl. 154—45.9)

This invention relates to thermosetting adhesives. More particularly it is directed to thermosetting adhesives suitable for radio frequency gluing comprising thermosetting aminotriazine resins and a potentially acidic substance, process of making same, and products obtained therewith.

Considerable difficulty has been encountered in the field of radio frequency gluing. For example, there are frequently explosions and wood charring of the glue line. Accordingly, it is an object of this invention to provide an adhesive which will be free of explosion or wood charring when subjected to radio frequency gluing. Another object of this invention is to provide a relatively short and flexible set-up and pressing time for bonded articles having an increased glue line strength. A further object of this invention is to provide an adhesive suitable for radio frequency gluing techniques which will have an excellent working life. Still further objects of this invention is to provide a process for preparing an adhesive suitable for radio frequency gluing, requiring a minimum power consumption and products bonded therewith.

The foregoing and other objects and advantages of this invention are obtained by incorporating a relatively small amount of partially esterified sebacic acid glycerol into a dry thermosetting aminotriazine resin, or solution, dispersion, and emulsion thereof.

In order to more adequately and fully describe this invention, the following examples are given by way of illustration.

EXAMPLE 1

Partially esterified sebacic glycerol was prepared by mixing 202 parts of sebacic acid and 92 parts of glycerol into a paste and heating on a hot plate. Melting began in 5 minutes, at the end of which time the temperature had risen to 215° C. A clear amber liquid was obtained, which upon cooling formed a cream-colored soap-like solid.

EXAMPLE 2

A melamine formaldehyde resin solid adhesive was prepared by reacting 3 mols of formaldehyde with 1 mol of melamine at a pH of 8 for 30 minutes, to a temperature of 85° C., after which the temperature was lowered to 70° C. and held until the hydrophobic resin was obtained, 1 to 1¾ hours being sufficient. The pH of the solution was adjusted to pH 9 and spray dried to yield a white water-soluble powder. Portions of this resin adhesive were intimately mixed with partly esterified sebacic acid glycerol prepared according to Example 1 to give compositions containing up to 10% sebacic acid glycerol. These dry compositions were then dispersed in water to form suspensions containing 50–60% solids. The gluing suspension prepared in this manner was spread on 1/16" birch panels (4" x 12") using 8 grams of glue per panel. After setting overnight, these panels were assembled in three ply and pressed in a radio frequency press at 250 p. s. i. The total pressing time was 8 minutes with radio frequency of 4.2 kw. input applied only during the first few minutes. The following table summarizes the results obtained with these compositions:

| Sebacic Acid Glycerol | Dry | | Soak 48 Hours | | Boil 3 Hours | |
|---|---|---|---|---|---|---|
| | lbs. Break | Per Cent Wood Failure | lbs. Break¹ | Per Cent Wood Failure¹ | lbs. Break | Per Cent Wood Failure |
| Per cent | | | | | | |
|  | 350 | 70 | 260 | 100 | 260 | 100 |
| 1 | 430 | 80 | 340 | 100 | 350 | 100 |
| 1 | 400 | 100 | 370 | 100 | 390 | 100 |
| 1 | 440 | 90 | 360 | 100 | 450 | 100 |
| 3 | 430 | 100 | 310 | 100 | 300 | 100 |
| 5 | 480 | 90 | 300 | 50 | 280 | 100 |
| 10 | 360 | 60 | 240 | 100 | 220 | 100 |

¹ Delaminated.

The A. S. T. M. pamphlet entitled "A. S. T. M. Standard on Adhesives," dated January 1950, page 819, defines wood failure as "The rupturing of wood fibers in strength tests on bonded specimens, usually expressed as the percentage of the total area involved which shows such failure." The U. S. Department of Commerce pamphlet numbered CS45-45, entitled "Plywood; Douglas Fir," dated January 27, 1945, sets forth on pages 5 and 6 a lengthy discussion of tests to be applied to bonded wood panels, and therein is set forth a discussion of wood failure and minimum requirements thereof.

Adhesive compositions were prepared according to procedure of Example 1 using 0.25%, 0.5% and 1.0% partially esterified sebacic acid glycerol. These compositions were tested with a working life of 7 hours and an overnight set. The 0.25% composition was a syrupy paste, the 0.5% composition was a thin paste whereas the 1.0% composition was a soft paste which was satisfactory to meet the requirements of a good adhesive. Accordingly, a composition containing 1% partially esterified sebacic acid glycerol was prepared according to Example 1, and several other factors were varied to determine their effect on the ultimate glue line strength.

EXAMPLE 3

Birch panels of the type described in Example 1 were coated according to the procedure there described with an aqueous dispersion of a melamine formaldehyde resin containing 1% partially esterified sebacic acid glycerol. In the lamination of these panels several factors were varied to determine the effect on the ultimate curing and glue line strength. For example, the set up time was varied at 1½ hours, 3 hours and 5 hours; the radio frequency exposure time was varied at 1 minute, 1½ minutes and 2 minutes, and the pressing time was varied at 2, 3, 5, 6 and 8 minutes. One minute radio frequency exposure time was found to be insufficient for cure. Accordingly, the following tabulation of results is compiled from only the 1½ and 2 minute radio frequency exposures.

point of the final acidity of the fixed glue, the lower acid number is preferable. It was found that a composition containing 2 parts sebacic acid glycerol-"Solox" solution mixed with 100 parts melamine formaldehyde in aqueous suspension gave an adhesive causing a relatively large temperature gradient between the glue line and the

| Conditions | Press time in Minutes | Dry | | Soak 48 Hours | | Boil 3 Hrs. | |
|---|---|---|---|---|---|---|---|
| | | lbs. Break | Percent, Wood Failure | lbs. Break | Percent, Wood Failure | lbs. Break | Percent, Wood Failure |
| 1½ hr. Set Up: | | | | | | | |
| 2 Min. R. F.. | 8 | 540 | 70 | 530 | 20 | 470 | 100 |
| | 6 | 670 | 100 | 530 | 100 | 470 | 100 |
| | 5 | 400 | 0 | 590 | 30 | 530 | 100 |
| | 3 | 550 | 60 | 530 | 100 | 460 | 100 |
| 1½ Min. R.F. | 8 | 200 | 0 | 320 | 0 | 470 | 0 |
| | 6 | 590 | 100 | 540 | 100 | 520 | 100 |
| | 5 | 580 | 100 | 490 | 100 | 440 | 100 |
| | 3 | 580 | 100 | 510 | 100 | 480 | 100 |
| 3 hr. Set Up: | | | | | | | |
| 2 Min. R. F.. | 8 | 370 | 70 | 430 | 20 | 400 | 90 |
| | 5 | 560 | 100 | 480 | 90 | 470 | 100 |
| | 3 | 620 | 100 | 610 | 90 | 590 | 80 |
| 1½ Min. R.F. | 8 | 530 | 100 | 460 | 100 | 420 | 100 |
| | 5 | 600 | 80 | 370 | 100 | 390 | 100 |
| | 3 | 630 | 90 | 620 | 100 | 540 | 100 |
| 5 hr. Set Up: | | | | | | | |
| 2 Min. R. F.. | 8 | 600 | 100 | 590 | 100 | 610 | 100 |
| | 6 | 620 | 100 | 540 | 100 | 430 | 100 |
| | 5 | 560 | 100 | 550 | 100 | 440 | 100 |
| | 3 | 640 | 100 | 550 | 100 | 350 | 100 |
| | 2 | 650 | 80 | 580 | 100 | 580 | 100 |
| 1½ Min. R.F. | 8 | 700 | 100 | 745 | 100 | 580 | 80 |
| | 6 | 650 | 100 | 550 | 100 | 590 | 100 |
| | 5 | 590 | 0 | 520 | 100 | 370 | 100 |
| | 3 | 670 | 100 | 530 | 100 | 470 | 100 |
| | 2 | 660 | 100 | 510 | 60 | 450 | 100 |

In all of the above experiments there was no explosion or wood charring during the laminating.

The working life of the partially esterified sebacic acid glycerol melamine formaldehyde adhesive was found to be approximately 24 hours, and panels coated therewith were sufficiently dry after 1½ hours for use in lamination. With thin sections or laminae, as short a cycle as 1½ minutes radio frequency time, and 2 minutes press time at 250 p. s. i. is more than satisfactory. Accordingly, complete fabrication can be accomplished, if necessary, in less than 2 hours from the time of spreading glue or adhesive. With this adhesive, set up time and press time are very flexible and are capable of being modified for the type of production schedule desired.

The partially esterified sebacic acid glycerol was dissolved in "Solox," a denatured alcohol containing approximately 87.3% ethanol, to make a 50% solution. The sebacic acid glycerol and "Solox" is preferably reacted to decrease the acid number of the solution. With the exception of stability of product, the acid number is not of critical importance. However, from the standwood when in the radio frequency field. This is a very desirable action.

The following examples illustrate the utility of sebacic acid glycerol in a 50% "Solox" solution as an accelerator for aminotriazine aldehyde adhesives.

EXAMPLE 4

100 parts of dry, powdered melamine formaldehyde resin prepared according to the procedure of Example 1 were dispersed in 65 parts of water, to which there was added 2 parts of a 50% "Solox" solution of partially esterified sebacic acid glycerol prepared according to the procedure of Example 1. This "Solox" solution of sebacic acid glycerol had been reacted to an acid number of 56. The adhesive prepared in this manner was spread on 1/16" birch panels in an amount sufficient to give 8 grams per glue line for 4" x 12" panels. These panels were laminated into laminates of 3 and 6 ply by pressing at 250 p. s. i. pressure and using radio frequency heat, 3.4 kilowatt at 10 megacycles input, the voltage at the electrode being 1.5 kilovolts. The following table summarizes the results obtained from this composition.

| Conditions | Press time in Minutes | Dry | | Soak 48 Hours | | Boil 3 Hrs. | |
|---|---|---|---|---|---|---|---|
| | | lbs Break | Percent, Wood Failure | lbs. Break | Percent, Wood Failure | lbs. Break | Percent, Wood Failure |
| 2 hrs. set: | | | | | | | |
| 2 min. R. F.. | 6 | 620 | 100 | 610 | 100 | 590 | 100 |
| | 3 | 630 | 100 | 600 | 80 | 530 | 80 |
| 1½ min. R. F. | 6 | 680 | 100 | 560 | 100 | 530 | 100 |
| | 3 | 590 | 10 | 600 | 90 | 550 | 100 |
| 3 hr. Set: | | | | | | | |
| 2 min. R. F.. | 6 | 690 | 80 | 570 | 80 | 510 | 100 |
| | 3 | 720 | 50 | 730 | 80 | 630 | 80 |
| 1½ min. R. F. | 6 | 680 | 100 | 640 | 90 | 590 | 100 |
| | 3 | 500 | 40 | 620 | 90 | 620 | 100 |
| 5 hr. set: | | | | | | | |
| 2 min. R. F.. | 6 | 670 | 100 | 680 | 100 | 630 | 100 |
| | 3 | 610 | 90 | 670 | 100 | 600 | 100 |
| 1½ min. R. F. | 6 | 620 | 100 | 600 | 100 | 550 | 100 |
| | 3 | 620 | 90 | 650 | 100 | 610 | 100 |

EXAMPLE 5

Plywood laminates were prepared according to the procedure of Example 4 with the exception that the "Solox" solution of sebacic acid glycerol was reacted to an acid number of only 194. The following examples summarize the results obtained from this adhesive:

| Conditions | Press time in Minutes | Dry | | Soak 48 Hours | | Boil 3 Hrs. | |
|---|---|---|---|---|---|---|---|
| | | lbs. Break | Percent, Wood Failure | lbs. Break | Percent, Wood Failure | lbs. Break | Percent, Wood Failure |
| 2 hr. set: | | | | | | | |
| 2 min. R. F. | 6 | 710 | 100 | 700 | 100 | 630 | 100 |
| | 3 | 700 | 80 | 580 | 100 | 480 | 100 |
| 1½ min. R. F. | 6 | 730 | 90 | 590 | 100 | 550 | 100 |
| | 3 | 720 | 100 | 640 | 100 | 610 | 100 |
| 3 hr. set: | | | | | | | |
| 2 min. R. F. | 6 | 700 | 100 | 590 | 100 | 530 | 100 |
| | 3 | 670 | 100 | 590 | 100 | 510 | 100 |
| 1½ min. R. F. | 6 | 790 | 100 | 730 | 100 | 600 | 100 |
| | 3 | 560 | 60 | 630 | 100 | 540 | 40 |
| 5 hr. set: | | | | | | | |
| 2 min. R. F. | 6 | 690 | 100 | 720 | 100 | 650 | 100 |
| | 3 | 650 | 100 | 680 | 100 | 600 | 100 |
| 1½ min. R. F. | 6 | 750 | 50 | 660 | 90 | 600 | 60 |
| | 3 | 730 | 100 | 570 | 100 | 540 | 100 |

EXAMPLE 6

Example 4 was repeated with the exception of the acid number of the sebacic acid glycerol solution being only 137 in this case. The following table summarizes the results obtained using an adhesive mix prepared in this composition:

| Conditions | Press time in Minutes | Dry | | Soak 48 Hours | | Boil 3 Hrs. | |
|---|---|---|---|---|---|---|---|
| | | lbs. Break | Percent, Wood Failure | lbs. Break | Percent, Wood Failure | lbs. Break | Percent, Wood Failure |
| 2 hours. set: | | | | | | | |
| 2 min. R. F. | 6 | 780 | 90 | 640 | 100 | 600 | 80 |
| | 3 | 660 | 100 | 630 | 90 | 590 | 100 |
| 1½ min. R. F. | 6 | 670 | 100 | 610 | 100 | 540 | 100 |
| | 3 | 550 | 80 | 630 | 100 | 580 | 100 |
| 3 hr. set: | | | | | | | |
| 2 min. R. F. | 6 | 610 | 100 | 560 | 100 | 550 | 100 |
| | 3 | 640 | 100 | 630 | 100 | 560 | 100 |
| 1½ min. R. F. | 6 | 670 | 100 | 650 | 100 | 580 | 100 |
| | 3 | 660 | 100 | 630 | 100 | 570 | 100 |
| 5 hr. set: | | | | | | | |
| 2 min. R. F. | 6 | 630 | 100 | 600 | 100 | 560 | 100 |
| | 3 | 600 | 100 | 630 | 100 | 600 | 100 |
| 1½ min. R. F. | 6 | 680 | 100 | 630 | 100 | 580 | 100 |
| | 3 | 640 | 90 | 600 | 100 | 540 | 100 |

In the above Examples 4, 5 and 6, edgewise as well as parallel electrodes were set up, and temperature measurements were made in the laminates to determine the temperature gradient, if any, between the wood and the glue line. The following table presents the temperature gradients determined between wood and glue line:

*Temperature*

| Run No. | Glue Line | Wood |
|---|---|---|
| | °F. | |
| 1 | 266 | 203°F., 1 ply apart.[1] |
| 2 | 228 | 127°F., 1 inch apart.[1] |
| 3 | 291 | 215°F., 2 min. R. F.[2] |
| 3 | 307 | 258°F., 4 min. R. F.[2] |
| 3 | 338 | 271°F., 6 min. R. F.[2] |

1 and #2 edgewise electrodes 2 minutes R. F. at 1.2 kw.
3 Parallel electrodes at 2.4 kw.
[1] Thermocouples 1/16" apart.
[2] Thermocouples 3/8" apart.

As can be seen from the above table, there is a large temperature difference between the glue line and the adjacent wood. Also it is noted that that when overheated as a result of long exposure to radio frequency, the partially esterified sebacic acid glycerol melamine formaldehyde adhesive does not overcure, burn or char. This is a favorable factor since it is an additional indication that cure time is not critical for this composition. This factor is not true in the case of some other types of adhesives, particularly urea and urea modified adhesives, since their cure time using radio frequency heat is very critical.

EXAMPLE 7

A composition was prepared using a mixed resin prepared as follows: the melamine formaldehyde syrup prepared according to the procedure of Example 1 was mixed with an equal portion of an urea formaldehyde syrup prepared by reacting 2¼ mols of formaldehyde per mol of urea at a pH of approximately 7.8 by heating to reflux and holding at that temperature for 15 minutes, and then adding sufficient urea to make the ratio of formaldehyde to urea approximately 1.7:1. The mixture was reheated to reflux and held for the desired viscosity. The blend of these two resin syrups was spray dried and the powder obtained therefrom blended to give a composition comprising approximately 80 parts resin, 17 parts wood flour and 3 parts tricalcium phosphate. To 100 parts of this composition there was added 65 parts of water and 2 parts of a 50% "Solox" solution of partially esterified sebacic acid glycerol. The adhesive of this composition was applied to birch panels which were superimposed upon one another to form a laminate which was pressed at 250 p. s. i. in a radio frequency press. After many experimental tests it was ascertained that the radio frequency exposure time is critical and lies between 30 and 45 seconds, since panel laminates with exposure time below 30 seconds exposure could be delaminated by hand, and those subjected to an exposure time above 45 seconds arced and charred. There was further noted that the temperature gradient between the wood and the glue line was relatively small. For example, when the radio frequency time was 30 seconds, the relative temperatures were 190° F. wood line, and 197° F. glue line, while at 45 seconds radio frequency exposure time, the wood line was 240° F. and the glue line was 249° F.

We claim:

1. A thermosetting adhesive suitable for radio frequency gluing comprising thermosetting melamine-formaldehyde resin and 1% to 5% of an ester obtained by reacting substantially equal molecular proportions of glycerol and sebacic acid, said percentage being based on the weight of the resin solid.

2. A thermosetting adhesive suitable for radio frequency gluing comprising melamine-formaldehyde resin and 1% to 5% of an ester obtained by reacting substantially equal molecular proportions of glycerol and sebacic acid, said percentages being based on the weight of the resin solid, dispersed in a volatile liquid media.

3. A thermosetting adhesive suitable for radio frequency gluing comprising an aqueous dispersion of thermosetting melamine-aldehyde resin and 1% to 5% by weight of an ester obtained by reacting substantially equal molecular proportions of glycerol and sebacic acid, based on the weight of the resin solid.

4. A laminate comprising wooden panels bonded together in superimposed relationship with an adhesive comprising thermosetting melamine-formaldehyde resin and 1% to 5% of an ester obtained by reacting substantially equal molecular proportions of glycerol and sebacic acid, based on the weight of the resin solid.

5. A thermosetting adhesive suitable for radio frequency gluing comprising a mixture of an aqueous dispersion of thermosetting melamine-formaldehyde resin and a volatile organic solution of 1% to 5% by weight of an ester obtained by reacting substantially equal molecular proportions of glycerol and sebacic acid, said percentage being based on the weight of the resin solid.

JOHN C. MEAD.
WILLIAM C. SCHNEIDER.

REFERENCES CITED

The following references are of record in the file of this patent:

UNITED STATES PATENTS

| Number | Name | Date |
| --- | --- | --- |
| 2,197,357 | Widmer et al. | Apr. 16, 1940 |
| 2,386,744 | Myers | Oct. 9, 1945 |
| 2,460,186 | Moffett | Jan. 25, 1949 |

FOREIGN PATENTS

| Number | Country | Date |
| --- | --- | --- |
| 533,997 | Great Britain | Feb. 25, 1941 |
| 867,065 | France | June 30, 1941 |